United States Patent
Mahle et al.

(10) Patent No.: US 10,876,410 B2
(45) Date of Patent: Dec. 29, 2020

(54) TURBOMACHINE AIRFOIL ARRAY

(71) Applicant: MTU Aero Engines AG, Munich (DE)

(72) Inventors: Inga Mahle, Munich (DE); Markus Brettschneider, Karlsfeld (DE); Fadi Maatouk, Munich (DE)

(73) Assignee: MTU Aero Engines AG, Munich (DE)

( * ) Notice: Subject to any disclaimer, the term of this patent is extended or adjusted under 35 U.S.C. 154(b) by 43 days.

(21) Appl. No.: 16/032,294

(22) Filed: Jul. 11, 2018

(65) Prior Publication Data
US 2019/0017384 A1    Jan. 17, 2019

(30) Foreign Application Priority Data

Jul. 14, 2017   (EP) ..................................... 17181379

(51) Int. Cl.
*F01D 5/14*     (2006.01)
*F01D 5/22*     (2006.01)
(Continued)

(52) U.S. Cl.
CPC ............. *F01D 5/141* (2013.01); *F01D 5/143* (2013.01); *F01D 5/145* (2013.01); *F01D 5/225* (2013.01);
(Continued)

(58) Field of Classification Search
CPC .......... F01D 5/141; F01D 5/143; F01D 5/145; F01D 5/225; F01D 9/04; F01D 9/041; F05D 2250/711; F05D 2250/712
See application file for complete search history.

(56) References Cited

U.S. PATENT DOCUMENTS 6,471,474 B1 * 10/2002 Mielke ...................... F01D 5/02
                                                   29/889.21
6,478,545 B2 * 11/2002 Crall .................... B23K 20/129
                                                   416/213 R
(Continued)

FOREIGN PATENT DOCUMENTS

DE      102008021053    10/2009
EP         2423444       2/2012
(Continued)

*Primary Examiner* — David E Sosnowski
*Assistant Examiner* — Danielle M. Christensen
(74) *Attorney, Agent, or Firm* — Davidson, Davidson & Kappel, LLC

(57) ABSTRACT

An airfoil array for a turbomachine, in particular a turbine or compressor stage of a gas turbine. The airfoil array includes at least two airfoils and at least one contoured circumferential surface which connects a pressure side of one airfoil to a suction side of the other airfoil and includes an upstream first section and a downstream second section which adjoins the first section along an elevation contour line; the first section being depressed relative to a rotationally symmetric reference surface containing this elevation contour line away from the airfoils, and the second section not being depressed relative to this reference surface away from the airfoils; this elevation contour line lying in an axial area which terminates at most 30% of an axial chord length of one of the airfoils downstream of its leading edge; and an axial distance of this elevation contour line increasing toward the pressure side and toward the suction side, starting at a point between the pressure and suction sides that is closest to the leading edge; and the first section extending over at least 90% of the space between the pressure side and the suction side.

20 Claims, 1 Drawing Sheet

(51) Int. Cl.
*F01D 9/04* (2006.01)
*F04D 29/54* (2006.01)

(52) U.S. Cl.
CPC .............. *F01D 9/04* (2013.01); *F01D 9/041* (2013.01); *F04D 29/544* (2013.01); *F05D 2250/711* (2013.01)

(56) References Cited

U.S. PATENT DOCUMENTS

| | | |
|---|---|---|
| 6,561,761 B1 * | 5/2003 | Decker ................ F04D 29/681 415/173.1 |
| 8,356,975 B2 | 1/2013 | Grover et al. |
| 8,744,823 B2 | 6/2014 | Sautreau et al. |
| 8,834,129 B2 * | 9/2014 | Barnes .................... F01D 5/143 416/193 A |
| 9,051,840 B2 | 6/2015 | Mitsuhashi et al. |
| 10,294,805 B2 * | 5/2019 | Potter ...................... F01D 5/02 |
| 2010/0143139 A1 | 6/2010 | Pandey et al. |
| 2014/0169977 A1 | 9/2014 | Brettschneider et al. |
| 2015/0044038 A1 | 2/2015 | Gier et al. |
| 2016/0319835 A1 * | 11/2016 | Potter ...................... F01D 5/02 |
| 2017/0159443 A1 | 6/2017 | Pernleitner et al. |

FOREIGN PATENT DOCUMENTS

| | | |
|---|---|---|
| EP | 2746533 A1 | 6/2014 |
| EP | 2746553 | 6/2014 |
| EP | 2835499 | 2/2015 |
| EP | 3064706 A1 | 9/2016 |
| EP | 3179036 | 6/2017 |
| WO | WO2014105102 | 7/2014 |

* cited by examiner

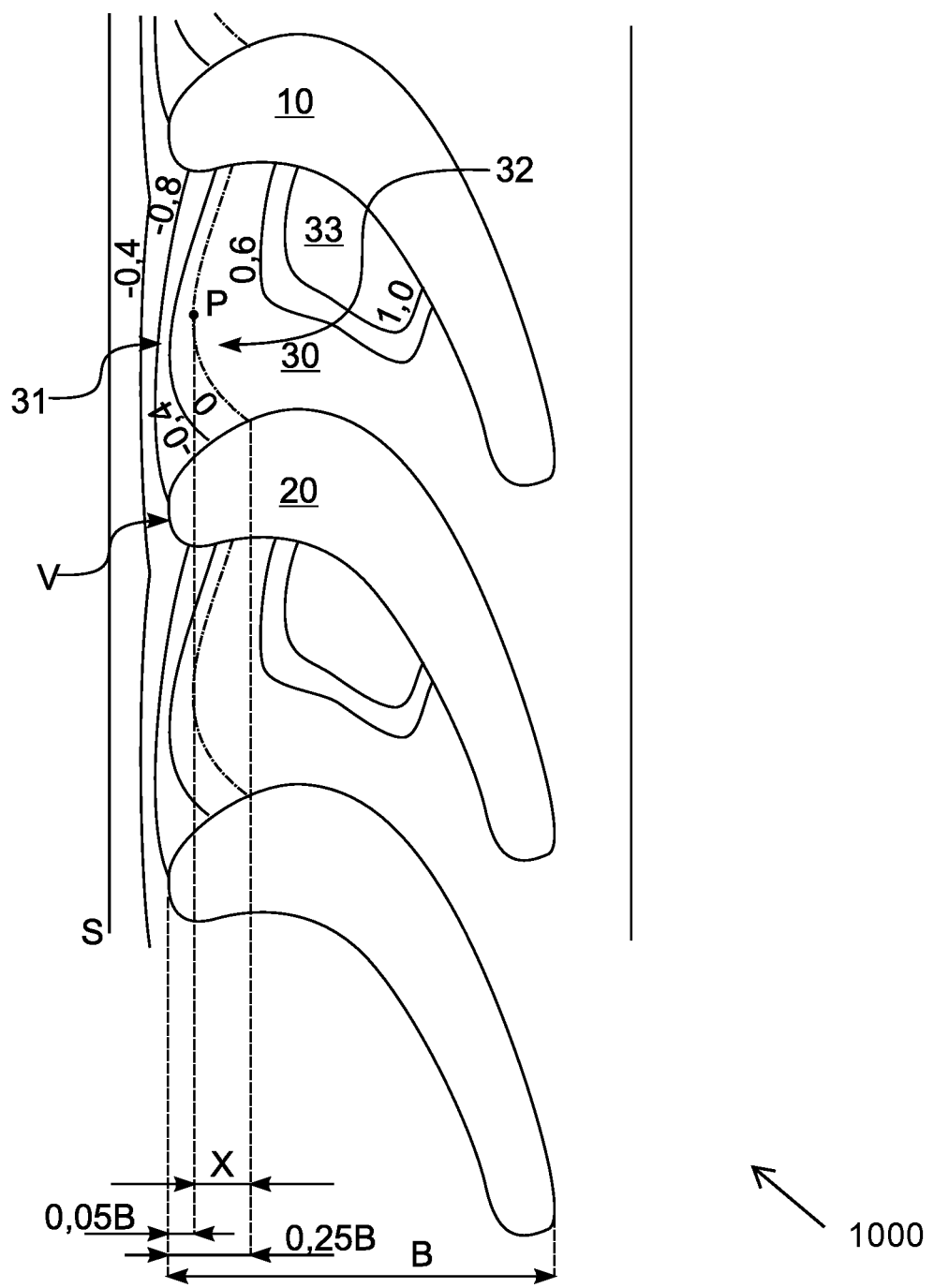

TURBOMACHINE AIRFOIL ARRAY

This claims the benefit of European Patent Application EP 17181379.3, filed Jul. 14, 2017 and hereby incorporated by reference herein.

The present invention relates to an airfoil array for a turbomachine, in particular a turbine or compressor stage of a gas turbine, a turbomachine stage, in particular a turbine or compressor stage of a gas turbine, and a turbomachine, in particular a gas turbine, having the airfoil array, as well as a method for designing and/or manufacturing the airfoil array.

SUMMARY OF THE INVENTION

It is an object of an embodiment of the present invention to improve a turbomachine airfoil array.

The present invention provides an airfoil array. The invention also provides a turbomachine stage, in particular a turbine or compressor stage of a gas turbine, and a turbomachine, in particular a gas turbine, having one or more of the airfoil arrays or stages described herein, as well as a method for designing and/or manufacturing the same. Advantageous embodiments of the present invention are also provided.

In an embodiment of the present invention, an (at least one) airfoil array for a, in particular of a, turbomachine, particularly for a, in particular of a, turbine or compressor stage of a gas turbine, includes two or more airfoils which, in an embodiment, are disposed adjacent one another in a circumferential direction (of the turbomachine) and whose facing pressure and suction sides are (respectively) connected by at least one (radially) contoured circumferential surface.

In an embodiment, the airfoils are stator vanes fixedly or adjustably attached to a casing of the turbomachine (stage). In another embodiment, the airfoils are rotor blades mounted on a rotor of the turbomachine (stage).

Such airfoil arrays constitute a particularly advantageous application of the present invention.

In an embodiment, the contoured circumferential surface is a radially inner circumferential surface, in particular a circumferential surface located at the radially inner ends of airfoils, in particular an airfoil-facing circumferential surface or face of a (radially) inner shroud or of the rotor. In another embodiment, the contoured circumferential surface is a radially outer circumferential surface, in particular a circumferential surface located at the radially outer ends of airfoils, in particular an airfoil-facing circumferential surface or face of a (radially) outer shroud or of the casing. In an embodiment, the contoured circumferential surface bounds a flow passage between the airfoils; i.e., between their pressure and suction sides, radially, in particular inwardly or outwardly. Additionally or alternatively, the pressure and suction sides may be (respectively) connected by at least one additional, in particular contoured, circumferential surface; i.e., the flow passage between the airfoils; i.e., between their pressure and suction sides, may additionally or alternatively be bounded radially (outwardly or inwardly).

In an embodiment, the airfoil array is formed by individual airfoil segments, each of which may include exactly one, exactly two, exactly three, exactly four, exactly five, or more airfoils, which are preferably respectively integrally joined together as a single piece. Accordingly, the contoured circumferential surface between each two adjacent airfoils may be divided, for example, by an inter-segment gap between two adjoining platforms of adjacent airfoils of different airfoil segments, or may be undivided, such as between two adjacent airfoils of the same airfoil segment.

Such circumferential surfaces and airfoil arrays constitute a particularly advantageous application of the present invention.

In an embodiment of the present invention, the contoured circumferential surface, in a refinement also the additional contoured circumferential surface, each have an upstream or airfoil-leading-edge-side first section and a downstream or airfoil-trailing-edge-side second section which adjoins the first section, or merges, in particular smoothly, into the first section, along a (radial) elevation contour line or line of equal radial elevation or equal radial distance from an axis of rotation or (main) machine axis of the turbomachine (stage), which line is therefore also referred to as boundary line herein; the first section being depressed (radially) away from the airfoils; i.e., in particular, radially inwardly in the case of a radially inner circumferential surface and radially outwardly in the case of a radially outer circumferential surface, relative to a reference surface which is in particular rotationally symmetric to an axis of rotation or (main) machine axis of the turbomachine (stage) and contains this elevation contour or boundary line and which, in an embodiment, is cylindrical or (frusto)conical; and the second section not being depressed relative to this reference surface (radially) away from the airfoils, in particular coinciding with the reference surface or being elevated relative thereto toward the airfoils, at least in some areas.

In an embodiment, such a local depression makes it possible to improve, in particular, secondary and/or cooling air flows, in particular (secondary) flow losses and/or efficiencies of the turbomachine (stage).

In an embodiment of the present invention, this elevation contour or boundary line lies in an axial area which terminates at most or no further than 30%, in particular at most or no further than 25%, of an axial chord length of one of the airfoils; i.e., of an axial distance between its leading and trailing edges, downstream of its leading edge; i.e., which extends downstream from the leading edge of one of the airfoils a distance no greater than (of up to) 30%, in particular no greater than 25%, of an axial chord length of this airfoil; i.e., of an axial distance between its leading and trailing edges.

In an embodiment, this axial area, in which this elevation contour line lies, begins at least or no closer than 2.5%, in particular at least or no closer than 5%, and/or at most or no further than 15%, in particular at most or no further than 10%, of an or the axial chord length (of one of) the airfoil(s) downstream of its leading edge; i.e., this axial area, in which this elevation contour line lies, extends in a range beginning at least or no closer than 2.5%, in particular at least or no closer than 5%, and/or at most or no further than 15%, in particular at most or no further than 10%, of an or the axial chord length (of one of) the airfoil(s) downstream of its leading edge.

Thus, in an embodiment, a minimum axial distance of the elevation contour or boundary line from the leading edge of one of the airfoils is at least 2.5%, in particular at least 5%, and/or no greater than 15%, in particular no greater than 10%, of an axial chord length of this airfoil; i.e., of an axial distance between its leading and trailing edges. Additionally or alternatively, in an embodiment, a maximum axial distance of the elevation contour or boundary line from the leading edge of one of the airfoils is no greater than 35%, in particular no greater than 25%, of an axial chord length of this airfoil; i.e., of an axial distance between its leading and trailing edges.

In addition, in an embodiment of the present invention, starting at a point between the pressure and suction sides of the airfoils that is closest to the leading edge and, in an embodiment, is located in a middle third of the elevation contour or boundary line, an axial distance of this elevation contour or boundary line from or to the leading edge of one of the airfoils increases toward both the pressure side and the suction side, in an embodiment continuously, in particular differentiably continuously, and/or monotonically, in particular strictly monotonically. In an embodiment, the elevation contour or boundary line is kink-free and/or, in particular continuously, convex toward the leading edges of the airfoils. Alternatively or alternatively, it extends from the pressure side to the suction side. Thus, in an embodiment, it may be shaped like or in the form of a sickle.

In addition, in an embodiment of the present invention, the depressed first section bounded by this elevation contour or boundary line on the downstream side or airfoil trailing edge side extends (circumferentially) over at least 90% of the space between the pressure side and the suction side, in an embodiment from the pressure side of one airfoil and/or to the suction side of the other airfoil, in particular (continuously) from the pressure side of one airfoil to the suction side of the other airfoil.

Surprisingly, it has been found that such a depressed circumferential surface section with an elevation contour or boundary line shaped and disposed in such a way allows secondary and/or cooling air flows, in particular (secondary) flow losses and/or efficiencies of the turbomachine (stage), to be improved in a particularly advantageous manner.

In an embodiment, the first section, which is depressed relative to the reference surface (radially) away from the airfoils, extends to an upstream or airfoil-leading-edge-side end edge of the contoured circumferential surface. In other words, in an embodiment, the entire contoured circumferential surface is depressed from its upstream or airfoil-leading-edge-side end edge to the elevation contour or boundary line. In an embodiment, this enables manufacture to be simplified.

In another embodiment, the contoured circumferential surface includes another section which adjoins the first section on the upstream side and is not depressed relative to the reference surface away from the airfoils, at least in some areas. In other words, in an embodiment, between its upstream or airfoil-leading-edge-side end edge and the depressed first section, the contoured circumferential surface is not depressed (continuously); i.e., not (continuously) from its airfoil-leading-edge-side or upstream end edge to the elevation contour or boundary line. In an embodiment, this allows secondary and/or cooling air flows, in particular (secondary) flow losses and/or efficiencies of the turbomachine (stage), to be (further) improved.

In an embodiment, the depression relative to the reference surface in the first section varies in the axial direction. Additionally or alternatively, in an embodiment, the depression relative to the reference surface in the first section varies in the circumferential direction. In an embodiment, this allows secondary and/or cooling air flows, in particular (secondary) flow losses and/or efficiencies of the turbomachine (stage), to be (further) improved.

In an embodiment, the contoured circumferential surface includes a third section which adjoins the second section on the downstream side and is depressed relative to the reference surface away from the airfoils in (each of) one or more areas and/or is elevated toward the airfoils in (each of) one or more areas. In an embodiment, this allows secondary and/or cooling air flows, in particular (secondary) flow losses and/or efficiencies of the turbomachine (stage), to be (further) improved.

In an embodiment of the present invention, the contoured circumferential surface is (in each case) designed and/or manufactured such that it is configured as described herein; i.e., in particular such that it includes the here-described depressed first section as well as the non-depressed second section adjoining the first section on the downstream side along the elevation contour or boundary line.

In the context of the present invention, in an embodiment, a or the axial direction is parallel to an axis of rotation or (main) machine axis of the turbomachine (stage) and, correspondingly, a or the circumferential direction is in particular a direction of rotation of the turbomachine (stage), and, in an embodiment, a or the radial direction is perpendicular to the axial and circumferential directions.

BRIEF DESCRIPTION OF THE DRAWING

Other advantageous embodiments of the present invention will become apparent from the dependent claims and the following description of preferred embodiments. To this end, the only drawing, FIG. 1 shows a developed view or radial plan view partially schematically illustrating an airfoil array of a turbomachine according to an embodiment of the present invention.

DETAILED DESCRIPTION

FIG. 1 shows a portion of an airfoil array of a turbomachine 1000 (shown schematically) according to an embodiment of the present invention in a developed view or radial plan view looking radially inwardly or outwardly.

In the partial view of FIG. 1, there can be seen an airfoil 10, whose pressure side (at the bottom in FIG. 1) is connected to suction side (at the top in FIG. 1) of a circumferentially (vertically in FIG. 1) adjacent airfoil 20 by a circumferential surface 30, which is looked at from above in FIG. 1.

Circumferential surface 30 is contoured radially; i.e., perpendicularly to the image plane of FIG. 1 and has an elevation contour line which, in FIG. 1, is represented by a dash-dot line and denoted by "0" (to the left of this elevation contour line).

Circumferential surface 30 includes an upstream or airfoil-leading-edge-side first section 31 (to the left in FIG. 1) which is bounded by this elevation contour line "0" on the downstream side or airfoil trailing edge side (to the right in FIG. 1) and is depressed relative to a rotationally symmetric reference surface containing this elevation contour line "0" away from the airfoils (i.e., into the image plane of FIG. 1).

To illustrate this, in FIG. 1, two additional lines representing a uniform radial depression of (−)0.4 mm relative to the reference surface and an additional line representing a uniform radial depression of (−)0.8 mm are drawn in this depressed first section 31.

Circumferential surface 30 includes a downstream or airfoil-trailing-edge-side second section 32 (to the right in FIG. 1) which adjoins or merges into first section 31, along elevation contour line "0" and is not depressed relative to the rotationally symmetric reference surface.

In addition, circumferential surface 30 includes a third section 33 which adjoins second section 32 on the downstream side (to the right in FIG. 1) and is elevated relative to the rotationally symmetric reference surface.

To illustrate this, in FIG. 1, a line representing a uniform radial elevation of (+)0.6 mm and an additional line representing a uniform radial elevation of (+)1.0 mm relative to the reference surface are drawn in this third section 33.

In FIG. 1, these lines of uniform depression or elevation relative to the reference surface are denoted by the respective numerical depression or elevation values placed to the left thereof.

Also indicated in FIG. 1 are the axial chord length B of airfoil 20 as well as an axial area X extending from 5% of this axial chord length B to 25% of this axial chord length B of airfoil 20 downstream of its leading edge V.

It can be seen that elevation contour line "0", along which the non-depressed second section 32 adjoins the depressed first section 31, lies in this axial area X, that an axial distance (horizontal in FIG. 1) of this elevation contour line "0" from leading edge V of airfoil 20 increases toward both the pressure side and the suction side, starting at a point P between the pressure and suction sides that is closest to the leading edge; i.e., a point P on elevation contour line "0" that is spaced therefrom by the least distance, and that depressed section 31 extends continuously from the pressure side of airfoil 10 to the suction side of airfoil 20.

In the exemplary embodiment, depressed section 31 does not extend to an airfoil-leading-edge-side end edge S of the contoured circumferential surface. However, in a modification, it may extend to airfoil-leading-edge-side end edge S.

Although exemplary embodiments have been described in the foregoing, it should be noted that many modifications are possible. It should also be appreciated that the exemplary embodiments are only examples, and are not intended to limit the scope, applicability, or configuration in any way. Rather, the foregoing detailed description provides those skilled in the art with a convenient road map for implementing at least one exemplary embodiment, it being understood that various changes may be made in the function and arrangement of elements described without departing from the scope of protection as is derived from the claims and the combinations of features equivalent thereto.

LIST OF REFERENCE NUMERALS 10, 20 airfoil
30 circumferential surface
31 depressed first section
32 non-depressed second section
33 third section
B axial chord length
P point closest to the leading edge
S upstream end edge
V leading edge
X axial area

What is claimed is:

1. An airfoil array for a turbomachine, the airfoil array comprising:
at least a first and a second airfoil and at least one contoured circumferential surface connecting a pressure side of the first airfoil to a suction side of the second airfoil, the contoured circumferential surface including an upstream first section and a downstream second section adjoining the first section along an elevation contour line, the first section being depressed relative to a rotationally symmetric reference surface containing the elevation contour line away from the first and second airfoils, and the second section not being depressed relative to the reference surface away from the first and second airfoils, the elevation contour line lying in an axial area terminating at most 30% of an axial chord length of one of the first and second airfoils downstream of a leading edge of the one of the first and second airfoils; and an axial distance of the elevation contour line from a point of the elevation contour line between the pressure side and the suction side axially closest to the leading edge of the one of the first and second airfoils increasing toward the pressure side of first airfoil and the suction side of the second airfoil; and the first section extending circumferentially over at least 90% of a distance between the pressure side and the suction side, the contoured circumferential surface at the leading edge of the one of the first and second airfoils being depressed relative to the rotationally symmetric reference surface.

2. The airfoil array as recited in claim 1 wherein the depressed first section extends to an upstream end edge of the contoured circumferential surface.

3. The airfoil array as recited in claim 1 wherein the contoured circumferential surface includes another section adjoining the first section on the upstream side and not depressed relative to the reference surface away from the airfoils, at least in some areas.

4. The airfoil array as recited in claim 1 wherein the axial area begins at least 2.5% or at most 15% of an axial chord length of one of the first and second airfoils downstream of the leading edge.

5. The airfoil array as recited in claim 1 wherein the depression relative to the reference surface in the first section varies in the axial or circumferential directions.

6. The airfoil array as recited in claim 1 wherein the contoured circumferential surface includes a third section adjoining the second section on a downstream side, the third section being depressed relative to the reference surface away from the airfoils, at least in some areas or elevated toward the airfoils, at least in some areas.

7. The airfoil array as recited in claim 1 wherein the airfoils are stator vanes or rotor blades.

8. The airfoil array as recited in claim 1 wherein the contoured circumferential surface is a radially inner or outer circumferential surface.

9. A turbomachine stage comprising the airfoil array as recited in claim 1.

10. A turbine or compressor stage of a gas turbine comprising the turbomachine stage as recited in claim 9.

11. A turbomachine comprising the turbomachine stage as recited in claim 9.

12. A gas turbine comprising the turbomachine as recited in claim 11.

13. A method for manufacturing the airfoil array as recited in claim 1, the method comprising: manufacturing the contoured circumferential surface such that the first section is depressed relative to the reference surface away from the airfoils and the second section is not depressed relative to the reference surface away from the airfoils.

14. The airfoil array as recited in claim 1 wherein the contoured circumferential surface at the leading edges of both of the first and second airfoils is depressed relative to the rotationally symmetric reference surface.

15. The airfoil array as recited in claim 1 wherein the elevation contour line extends from the pressure side to the suction side.

16. The airfoil array as recited in claim 1 wherein the point is located between 2.5 and 15 percent of the axial chord length of the one of the first and second airfoils.

17. The airfoil array as recited in claim 1 wherein the point is located between 5 and 10 percent of the axial chord length of the one of the first and second airfoils.

18. An airfoil array for a turbomachine, the airfoil array comprising:
a first and a second airfoil and a contoured circumferential surface connecting a pressure side of the first airfoil to a suction side of the second airfoil, the contoured circumferential surface including an upstream first section and a downstream second section adjoining the first section along an elevation contour line, the first section being depressed relative to a rotationally symmetric reference surface containing the elevation contour line away from the first and second airfoils, and the second section not being depressed relative to the reference surface away from the first and second airfoils, the elevation contour line lying in an axial area terminating at most 30% of an axial chord length of both of the first and second airfoils downstream of leading edges of the first and second airfoils; and an axial distance of the elevation contour line from a point of the elevation contour line between the pressure side and the suction side axially closest to the leading edges of the first and second airfoils increasing toward the pressure side of first airfoil and the suction side of the second airfoil; and the first section extending circumferentially over at least 90% of a distance between the pressure side and the suction side, the contoured circumferential surface at the leading edges of the first and second airfoils being depressed relative to the rotationally symmetric reference surface.

19. A turbomachine stage comprising the airfoil array as recited in claim 18.

20. A turbine or compressor stage of a gas turbine comprising the turbomachine stage as recited in claim 18.

* * * * *